Oct. 21, 1958    R. K. LEE    2,856,782
CAMS
Filed Feb. 11, 1952    3 Sheets-Sheet 2
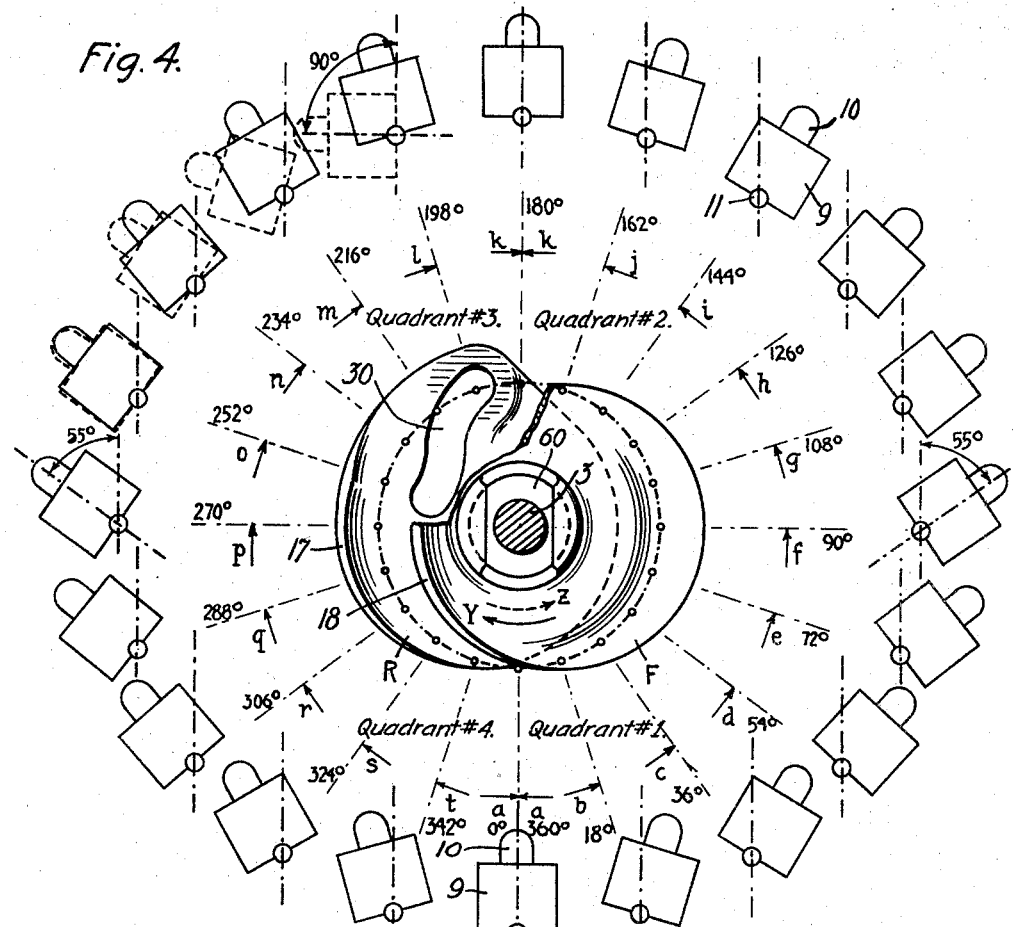
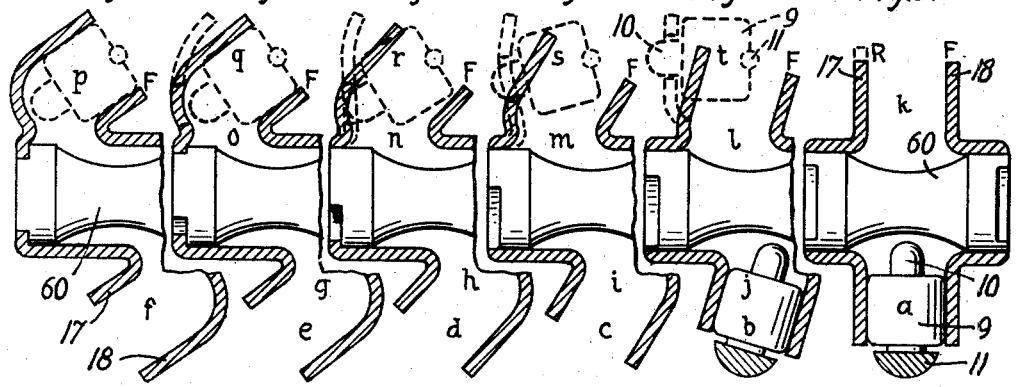
INVENTOR
ROGER KENNETH LEE
BY
ATTORNEY Oct. 21, 1958 R. K. LEE 2,856,782
CAMS
Filed Feb. 11, 1952 3 Sheets-Sheet 3
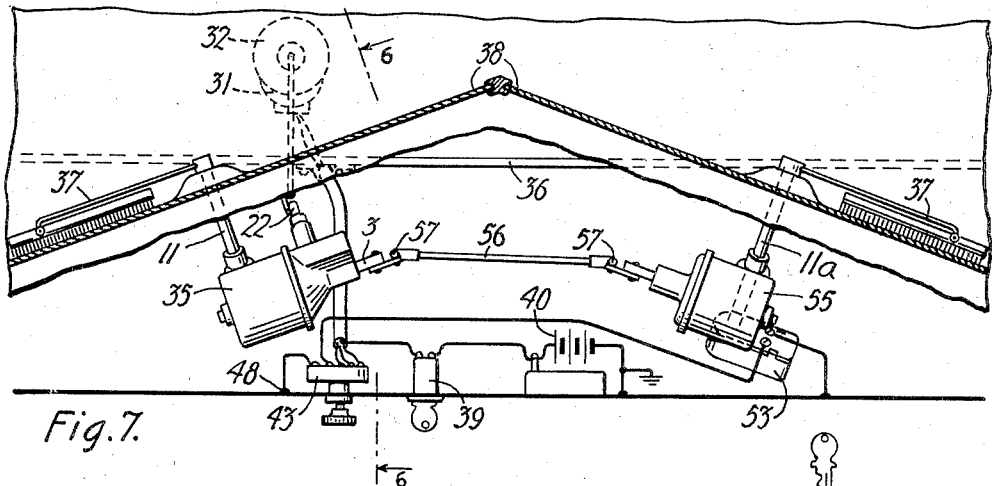
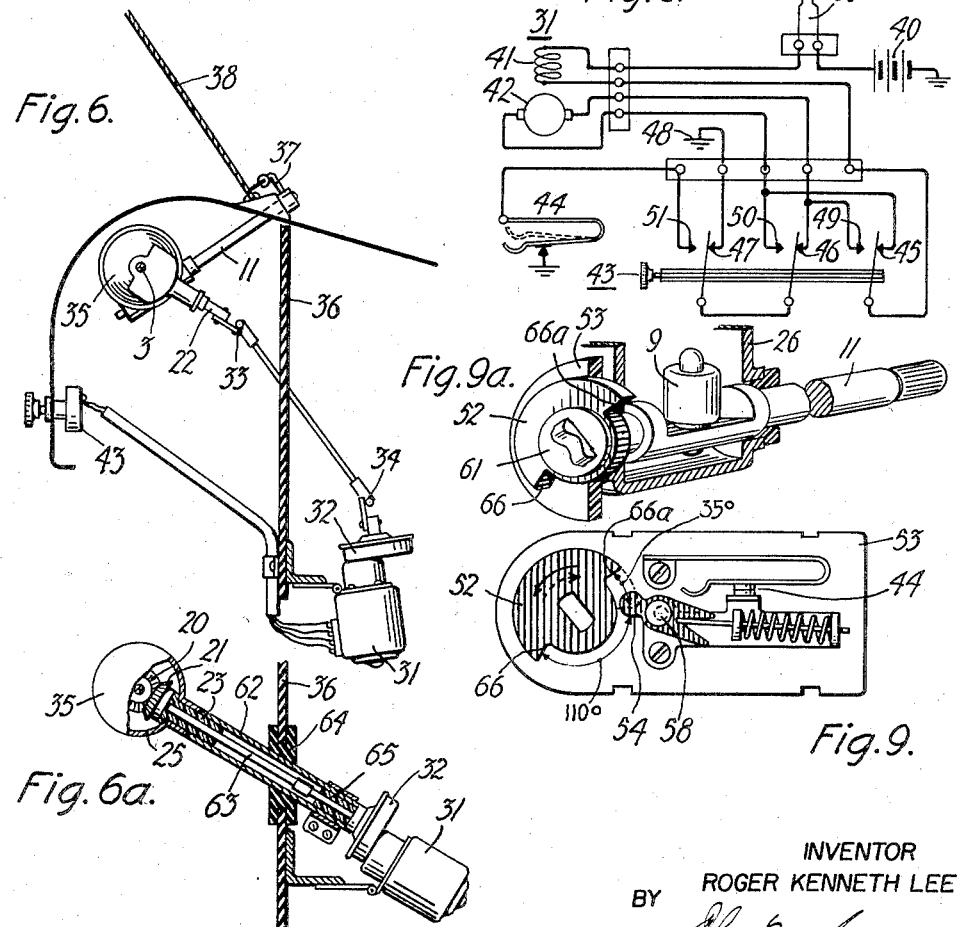
INVENTOR
ROGER KENNETH LEE
BY
ATTORNEY United States Patent Office 2,856,782
Patented Oct. 21, 1958

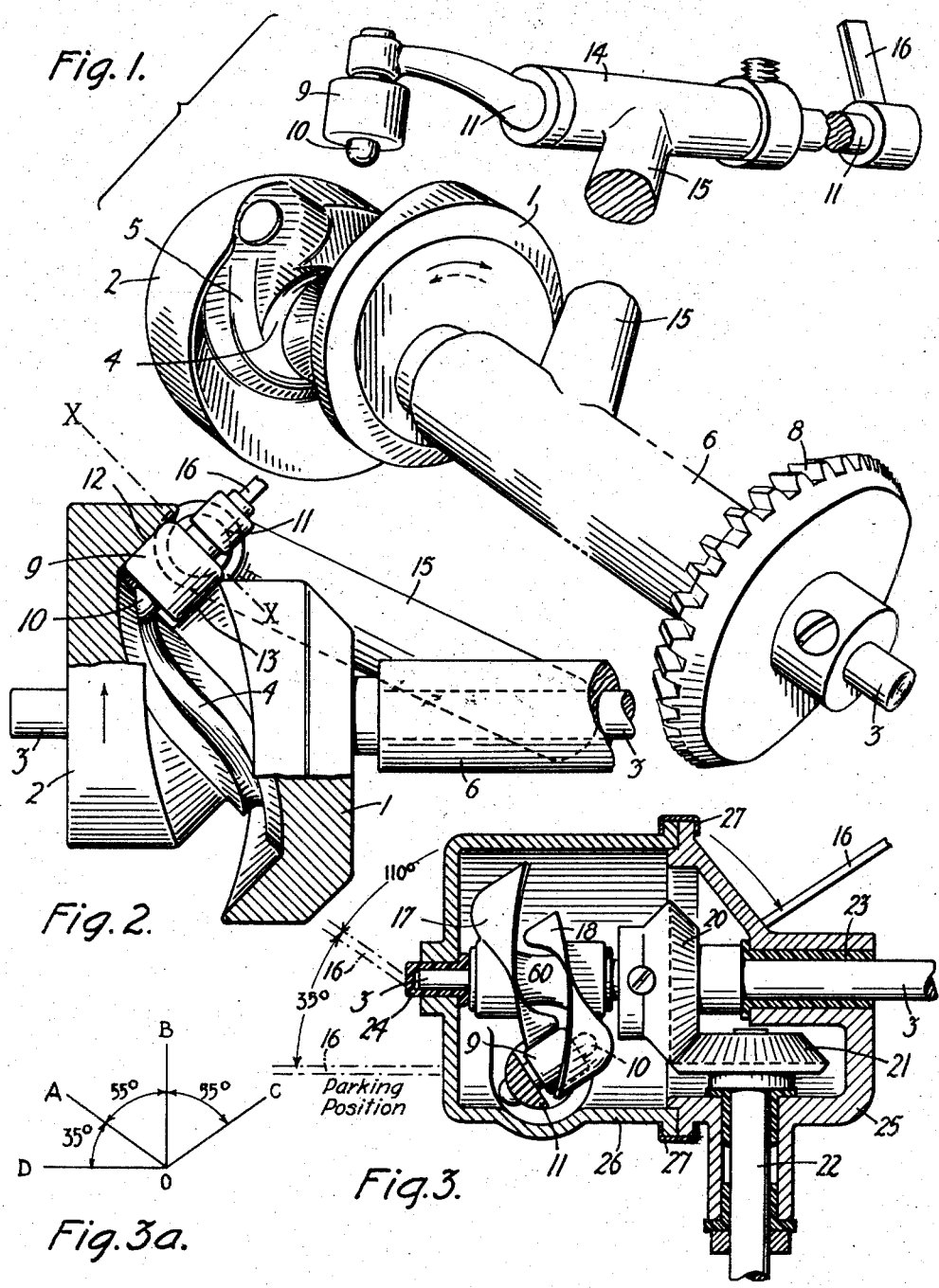

2,856,782
CAMS
Roger Kenneth Lee, Detroit, Mich., assignor, by decree of distribution, to Florence Little Lee Application February 11, 1952, Serial No. 271,033
12 Claims. (Cl. 74—57)

This invention relates to cams and particularly to a cam of the positive type which, when rotated at constant angular velocity, causes the follower to be oscillated cyclically by means of the continuous track of the cam, the form of the track being such as to cause the axis of the follower to move periodically through a given angular range.

Cams of the positive type are, of course, well known in the art, many illustrations of which may be found in the literature of machine design, but in all such cams heretofore disclosed, the axis of the roller follower during movement of the cam remains substantially perpendicular to the axis of the cam. In machine design it is frequently desirable to give to a shaft an oscillatory motion, which motion may be transmitted by the shaft to the apparatus to be oscillated thereby.

One of the objects of this invention is to provide means for producing such motion in a shaft, the means residing in a cam having a track of novel formation such that the axis of the roller connected to the shaft to be oscillated, is caused to move periodically through a given angular range by the rotation of the cam at constant angular velocity, that is to say, the axis of the roller follower does not remain perpendicular to the axis of the cam during the rotation of the cam (as in the cams heretofore used), but the angle that the axis of the roller makes with the axis of the cam changes continuously and cyclically throughout a given range during the rotation of the cam. A cam of this type may be employed for many and widely different purposes, such, for example, as the operation of the valves of an internal combustion engine or an automobile horn, or a windshield wiper—in fact, in many if not all places where a simple and rugged means for producing an oscillatory motion is required. For a complete understanding of the invention it will be described as employed in the operation of a windshield wiper, but it is to be understood that such a description is merely for the sake of illustration and is not to be construed as a limitation upon its use.

In the use of a cam of this type, it is sometimes desirable to lock the follower when the cam is not in operation, this feature being, of course, desirable when the cam is employed to operate a windshield wiper. This feature is provided by a novel formation of the track of the cam such that, upon the reversal of the normal, that is, the forward, direction of motion of the cam, the follower will be caused to enter a spur of the track and will be stopped therein. This not only effects the immediate locking of the follower, but also, by cooperation between the spur track and the roller shaft of the follower, looseness of the follower in the track is prevented. Furthermore, when the follower has moved to the stop position, its axis will have moved through a greater angular distance than it does in normal operation, thus placing the blade of the wiper further from the direct line of vision through the windshield.

This invention is applicable not only to the operation of a single windshield wiper, but also lends itself readily to the operation of two, three, or even more wipers by a single motor because of the simplicity of connection of the cam units as will later be fully described. This feature is of great importance in the sweeping of a wide windshield having no break in the continuity of the glass throughout its width since by the use of three or more wipers overlapping of the swept area is obtainable, and visibility is thereby greatly improved.

A further object of the invention resides in the provision of means to automatically open the circuit of the motor, by which the cam is driven, whenever the follower has been locked by the cam (as mentioned above) thus preventing injury to the motor.

Another object of the invention resides in the provision of means whereby the angular position of the shaft of the cam (which transmits oscillations to a windshield wiper) relative to the angular position of the gear shaft may be readily adjusted so as to conform to the shape and the position of the parts of an automobile upon which the wiper and its driving mechanism are to be mounted.

A feature of the invention is that it permits placing of the electric motor and the gear reduction within the engine compartment and the oscillatory mechanism within the driver's compartment thereby preventing or minimizing the noise arising from the operation of the windshield wiping mechanism.

Another feature that is inherent in the cam in which the present invention is embodied, is that a greater angle of oscillation is attainable than by the use of devices now used which employ connecting rods or link motion.

Another feature of the invention is that true harmonic oscillatory motion may be derived from constant angular velocity of the cam in which this invention is embodied.

Another feature of the invention is that it permits the application of a windshield wiper system in which the invention is employed to all types of cars, with only one change in the structure, namely, the length of the connecting shaft between the reduction gears and the gear that drives the cam.

Other objects and uses of this invention will be apparent from the following description when read in connection with the attached drawings in which:

Fig. 1 is a perspective, in exploded form of one form of the cam in which the present invention is embodied, the follower being shown removed from the track in order to reveal clearly the spur track onto which the follower passes upon reversal of direction of rotation of the cam;

Fig. 2 is a side view of the cam shown in Fig. 1, in which a portion of each side of the cam is partly broken away in order to show more clearly the cam track with a groove therein and the position of the follower in the track;

Fig. 3 is a side view of another form of the cam, embodying the present invention, together with a housing in which it is mounted, this form of cam differing from that of Fig. 1 in that it has no groove in the track;

Fig. 3a shows graphically the angle through which the cam-follower moves when the cam is rotating in its forward direction and the additional angular movement required for parking the follower when the direction of rotation of the cam is reversed;

Fig. 4 shows at the center thereof a side view of the cam shown in Fig. 3, the view being partly broken away to show a slot in one side of the cam track which engages the projecting end of the roller-shaft at the parking position; the figure also showing angular positions of the roller-shaft with respect to a plane perpendicular to the cam-shaft at various angular positions of the cam;

Figs. 5, 5a, 5b, 5c, 5d and 5e are cross-sectional views through the cam at the various angular positions indicated;

Fig. 6 shows, in schematic form, the use of the invention to operate a single windshield wiper, and Fig. 6a shows the use of a torque tube between the motor and the cam to reduce vibration in the system;

Fig. 7 shows in schematic form the use of the invention to operate two windshield wipers;

Fig. 8 is a circuit diagram showing the mode of controlling the wiper mechanism; and Fig. 9 shows a cam operated microswitch by which the motor circuit of the wiper is opened when the follower reaches a fixed point upon the parking track of the cam; Fig. 9a shows in fragmentary form the oscillator shaft arranged for connection to the arm of the wiper and also to the cam of the microswitch.

The cam, as shown in Figs. 1 and 2, is, in effect, formed by two discs 1 and 2 between which lies the track of the cam. These discs are eccentric with respect to the shaft 3 upon which the cam is mounted, as is clearly shown in those figures. The bottom of the track has therein a groove 4 which follows the center of the track and serves to guide the follower during the rotation of the cam. As shown in Fig. 1 there is provided a spur groove 5 which lies at the bottom of a spur track onto which the follower passes when the normal direction of rotation of the cam is reversed. As will be explained hereinafter in describing the use of the cam to operate a windshield wiper, the spur track provides for the parking of the follower and, by effecting further angular movement of the oscillator shaft, the wiper is moved further from the normal area of visibility through the windshield. The cam may be secured to the shaft 3 by a set-screw or key or by other suitable means such as welding. This shaft is supported by bearings in a journal box 6 and is adapted to be rotated by a motor connected directly or indirectly with the bevel-gear 8, the manner of doing which will later be explained.

Associated with the cam is a follower having a roller 9 which is mounted upon a shaft, the rounded end of which, 10, shows clearly in the figure. This shaft, hereinafter referred to as the roller-shaft, is securely fastened to the shaft 11, sometimes referred to as the oscillator shaft, which is journaled in the journal-box 14 and is oscillated by the angular movement of the shaft 10 as the roller 9 follows the track during rotation of the cam. The width of the track is such as to permit the roller to move smoothly therein with the end of the shaft 10 resting in the groove. The journal-box 14 is supported by a strut 15, shown in fragmentary form in Fig. 1, which is fastened to the journal-box 6 which supports the cam shaft. To the outer end of the shaft 11 may be fastened the member 16 to be oscillated such as the arm of a windshield wiper.

Assuming that the roller 9 is in the position shown in Fig. 2 when the cam begins to rotate in the direction indicated by the arrow, the roller-shaft 10 will begin to swing toward the right (as the cam is viewed in Fig. 2), this movement being effected by the pressure of the wall 12 against the roller. As the cam continues to move in the direction of the arrow, the shaft 10 will continue to move toward the right until the cam has completed one-half revolution at which time the axis of the shaft 10 will be along the line marked x—x. As the cam continues to rotate the shaft 10 will swing in the opposite direction and upon the completion of one full cycle of rotation of the cam the follower will return to the position in which it is shown by solid lines in Fig. 2. This oscillatory movement of the follower is effected by the formation of the track. As shown in Fig. 2, the walls of the track are substantially parallel but the angle that each wall makes with a plane perpendicular to the axis of the cam varies throughout each quarter of a cycle of movement of the cam, ranging from zero to a maximum through one quarter-cycle and from the maximum to zero during the next successive quarter-cycle of cam movement. This variation in the angle that the walls make with the said plane will be clear from the description of Figs. 4 and 5 which will presently be explained.

Fig. 3 shows a form of a cam embodying the present invention in which the side members 17 and 18 of the cam are formed by pressed material, metal or plastic, the formation being such as to provide a cam track which will cause the follower to oscillate in the manner hereinbefore described. Between the side members is a hub 60 which spaces the side members apart by the desired distance. The waistline of this hub is curved to provide the clearance necessary for the end 10 of the roller-shaft as that shaft swings during rotation of the cam. The side members 17 and 18 may be fastened to the cam shaft 3 by any suitable means, such as by set-screws or keys or by welding. Also fastened to the cam shaft is a bevel-gear 20 which meshes with another bevel-gear 21, the shaft 22 of which is connected directly or indirectly to a motor. The cam shaft 3 is supported by suitable bearings, as 23 and 24, which are positioned in a cam housing. This housing is formed in two parts, 25 and 26, which are securely held together by a clamp 27, the pressure exerted by this clamp being sufficient to hold the parts firmly together but at the same time being light enough to permit the parts to be rotated with respect to each other to effect the adjustment of the position of the drive shaft relative to that of the oscillator shaft when such adjustment is desired.

In order to make clear the form and structure of the cam track and to afford an idea of the continuous change in position of the shaft of the roller as the cam moves through each revolution, reference will now be had to Figs. 4 and 5. At the center of Fig. 4 is shown an end view of the cam in which this invention is embodied, particularly the form shown in Fig. 3. This end view shows clearly the displacement of the two discs that form the sides of the cam, the nearer disc being shown as broken away, in part, in order to reveal a slot designated 30 in the rear disc which serves to stop the movement of the follower (hereinafter referred to as the parking of the follower), the manner of doing which will presently be explained. For the purpose of description, the cam is indicated as divided into four quadrants, 1, 2, 3 and 4, each of which is divided into five equiangular parts. The heavy dots upon the dot-and-dash circle, that is concentric with the shaft of the cam, indicate the pivot point of the shaft of the roller 9, this pivot point being the axis of the shaft 11 to which the roller-shaft 10 is attached. In considering Fig. 4 it must be realized that the shaft 11 lies in a plane perpendicular to the cam shaft 3 and not parallel thereto as appears in Fig. 4, the perpendicular plane being represented by the dot-and-dash line extending through the center of the shaft 11.

Let it be assumed that the cam is at the outset in the position shown, and that the axis of the roller-shaft 10, at the position a, is in the plane perpendicular to the cam shaft 3. When the cam moves through the first quadrant, in the direction of the solid arrow Y, shown upon the side of the cam, the roller-shaft 10 will swing toward the right (as viewed in Fig. 4), turning pivotally upon the shaft 11, and at 18° of movement of the cam the shaft 10 will take the angular position indicated at b upon Fig. 4. The extent of movement of the shaft 10 is indicated by the angle between the vertical dot-and-dash line, passing through the center of the shaft 11 and the axis of the shaft 10 which also passes through the center of shaft 11. Thereafter as the cam continues to revolve the roller-shaft 10 will continue to move more and more toward the right, pivoting upon the shaft 11, until the cam has completed its movement through quadrant #1. At this point, designated f on the chart, the swing of the roller-shaft 10 toward the right will reach its maximum, the magnitude of which is, for illustration, indicated as 55°. As the cam moves through quadrant #2, it will cause the roller-shaft to swing back again to normal, that is to say, the position where its axis coincides with the plane normal to the cam-shaft 3, as indicated at point $k$ in the figure. As the cam continues to rotate through quadrant #3 it will cause the roller-shaft 10 to swing toward the left as indicated by the representation of the roller in solid lines in that quadrant, the roller-shaft reaching its maximum angular displacement of 55° at the end of the third quadrant. The representation of the roller-follower in dotted lines shows its position when the cam is reversed for the purpose of parking the follower, which will be fully explained hereinafter. Thereafter, as the cam continues its rotation, the roller-shaft will again swing toward the right and will reach the normal position at the end of quadrant #4 at the starting point $a$.

The following tables afford an idea of the angular magnitude of the cam track at five cross-sections in each quadrant of the cam. The data is illustrative and is not to be construed as limiting the invention to the magnitude shown.

*For quadrants 1, 2 and 4*

| Angular position of cross-sections with respect to the 0–180° Section, Fig. 4 | Angle made by each side of cam track with a plane normal to the cam shaft at the angular position of cross-sections | Figure of Drawing showing the cross-section |
| --- | --- | --- |
| Degrees: | | |
| 0, 180, 360 | 0° | 5 |
| 18, 162, 342 | 14°49′ | 5a |
| 36, 144, 324 | 28°45′ | 5b |
| 54, 126, 306 | 41°28′ | 5c |
| 72, 108, 288 | 51°55′ | 5d |
| 90, 270 | 55° | 5e |

*For quadrant 3*

| Angular position of cross-sections with respect to the 0–180° Section, Fig. 4 | Angle made by front side of cam track with plane normal to cam shaft at angular position of cross-sections, Fig. 4 | Angle made by the axis of the roller-follower with plane normal to cam shaft at angular position of cross-sections, Fig. 4 | Figure of Drawing showing the cross-section |
| --- | --- | --- | --- |
| Degrees: | | | |
| 180 | 0° | 0° | 5 |
| 198 | 14°49′ | 90° | 5a |
| 216 | 28°45′ | 74° | 5b |
| 234 | 41°28′ | 58° | 5c |
| 252 | 51°55′ | 55° | 5d |
| 270 | 55° | 55° | 5e |

Since the rear wall in quadrant #3 does not follow the same pattern that it assumes in the other quadrants but follows, as closely as possible, the imaginary surfaces generated by the edges of the roller 9 and the knob 10 upon the roller-shaft in its forward and reverse directions, the design of that wall is determined by the angle that the axis of the roller-follower 9 makes with the plane normal to the cam shaft at each of the cross-section positions set forth in the table.

Referring to Fig. 5, which is the cross-section at the 0°–180° line of Fig. 4, it will be seen that the sides of the cam track at that section are perpendicular to the shaft 11 of the cam and that the shaft of the roller 9 at position $a$ is likewise perpendicular to the shaft of the cam. As the cam rotates, the angle made by the sides of the cam track with a plane perpendicular to the cam shaft will gradually and continuously change, ranging from 0° at position $a$ to a maximum, say 55°, at position $f$, this variation being clearly shown by the successive portions of the cam track designated $a$ to $f$ shown in Figs. 5 to 5e, inclusive. The cross-sectional forms of the cam track at positions $g$, $h$, $i$, $j$ and $k$ of the quadrant #2, Fig. 4, are as represented in Figs. 5d, 5c, 5b, 5a and 5, respectively. Accordingly, the follower, after swinging through the maximum angular range from $a$ to $f$ will then swing in the reverse direction, until it reaches the 180° point where the sides of the track are again perpendicular to the cam shaft. As the cam continues to move forward, the follower will move into the third quadrant of the cam. The shape of the cam track in this quadrant differs from that in quadrants 1, 2 and 4, the track in quadrant 3 being shaped so as to provide not only the desired movement of the follower during the continuous forward movement of the cam, but also to provide for the parking of the follower when the direction of motion of the cam is reversed. To avoid confusion, we will first describe the manner in which the cam track acts upon the follower for normal forward operation and will describe later the parking operation.

When the roller-follower moves from quadrant #2 into quadrant #3, it will be pressed by the front side of the cam track marked F in Figs. 5 to 5e. In the third quadrant the front wall of the track makes the same angle with a plane perpendicular to the cam axis at the positions $k$ to $p$, Figs. 5 to 5e, as was made by the sides of the cam track at position $a$ to $f$ of quadrant #1, but, as shown in Fig. 4, the positions assumed by the shaft of the roller-follower in quadrants 1 and 3 are opposite, one being to the right and the other to the left. As the cam revolves about its axis, the roller 9 of the follower will be continuously pressed by the front side F of the cam track and, in consequence, the roller shaft will gradually change its angular position with respect to a plane perpendicular to the cam shaft, the angle ranging from 0° at $k$ (Fig. 5) to the assumed maximum of 55° at position $p$ (Fig. 5e).

Assuming that the cam continues to rotate in the forward direction, the follower will enter quadrant #4 of the cam. In that quadrant the walls that form the sides of the track are as shown in Figs. 5e to 5 by solid lines at positions $p$, $q$, $r$, $s$, $t$ and $a$. As the follower is moved by the rotation of the cam the angular displacement of the roller-shaft will gradually change from its maximum at position $p$ to zero degrees displacement at position $a$. Upon the return of the follower to the position shown at $a$, the came will have completed one revolution of its movement.

To summarize the foregoing description, the shaft 10 of the roller-follower will swing toward the right from its normal position at 0°, Fig. 4, when the cam begins to rotate and will continue to swing in that direction until it attains its maximum displacement at 90° of the cam rotation. Thereupon its direction of motion changes. It swings toward the left reaching its normal position at 180° of cam rotation but continuing toward the left until the cam has rotated through 270°, at which point the shaft 10 of the roller-follower will again attain its maximum angular displacement toward the left. Thereupon the direction of motion of the shaft 10 will be reversed and it will move toward the right until the 360° position of cam rotation is reached.

Reference has been made hereinbefore of the parking feature of the cam. The manner in which the follower is parked and the structure of the cam to accomplish that result will now be described. When it is desired to park the follower, the direction of rotation of the cam is reversed as indicated by the dotted arrow Z upon the front of the cam, Fig. 4. While this reversal may take place at any regular position of cam rotation, we will assume, for the sake of simplification of description, that the reversal takes place when the follower is at the 270° position of the cam. At this position the shaft of the roller-follower has attained its maximum displacement from the vertical, viz., 55°. When the direction of rotation of the cam is reversed so as to run backwardly, the follower comes under control of the rear wall of the cam track and it is by virtue of this that the parking of the follower is effected. As mentioned previously, the form of rear wall in quadrant #3 differs markedly from that in the other quadrants, the form in quadrant #3 being shown by dotted lines in Figs. 5a to 5e. This is accomplished in the following manner: As the cam rotates backwards from the 270° position of the cam, the axis of the roller 9 will continue to have the same angular position with respect to the plane perpendicular to the axis of the cam that it had at 270° (as shown in Fig. 5d) and the roller will continue to remain in such position until it comes in contact with the rear wall of the cam, this being for the reason that, upon reversal of the cam, the front wall withdrew from contact with the roller and in consequence there would be no pressure upon the roller until it comes in contact with the rear wall, which takes place at or just prior to the 234° position of the cam, as indicated in Fig. 5c. As there shown, the nose of the shaft 10 of the roller becomes engaged by the slot 30 in the rear wall of the cam and thereafter remains in engagement until the backward movement of the cam ceases. At the 234° position of the cam the axis of the roller 9, shown dotted, makes an angle of 58° with a plane perpendicular to the axis of the cam. This angle will steadily increase in magnitude due to the pressure of the sides of the slot against the end of the shaft 10 as the cam continues to rotate backwards and will have the magnitude of 74° at the 216° position of the cam as shown in Fig. 5b. With further backward movement of the cam the angle will continue to increase and will reach 90° at the 198° position of the cam. The roller will then have the position shown by dotted lines as shown in Fig. 5a.

When the cam is power-driven, as, for example, by a motor, means are provided which automatically stops the motor when the roller, in the course of its travel, reaches the end of the slot or substantially so; the manner in which this is done will be explained hereinafter. If, after the cam has stopped its backward movement it is then caused to rotate in its forward direction, the roller-follower will be moved in the slot in the back wall until its comes under control of the front wall of the cam at the 270° position thereof as shown in Fig. 5e and thereafter will be moved in the manner heretofore described for forward rotation of the cam.

One of the important uses of this cam is to operate a windshield wiper and the manner in which it may be so employed and controlled is shown in Figs. 6 to 9a, inclusive. Referring to Fig. 6, which shows the use of the cam to operate a single wiper, 31 represents a motor which is connected through reducing gears 32 to the gear shaft 22 of the cam unit 35, the connection including the universal joints 33 and 34 to compensate for angular differences between the shaft of the motor and the gear shaft arising largely from the positioning of motor and the cam unit, the former being preferably under the hood and the latter under the cowl of an automobile and separated by the dash 36. As more fully described in connection with Figs. 1 and 2, the shaft 11 will be oscillated by the roller-follower, under control of the cam, and the arm of the windshield wiper 37 will thereby be oscillated and will sweep the windshield 38.

The means for starting and stopping the motor is shown in the circuit diagram, Fig. 8, wherein 39 represents the usual ignition switch, 40 the battery, 41 represents the field winding of a motor 31, and 42 represents its armature, 43 represents a reversible switch for controlling the direction of rotation of the armature of the motor, and 44 represents a cam-controlled microswitch (more fully shown in Fig. 9) to open the motor circuit, preferably slightly before the shaft 11 of the follower ceases to move. The mode of operation of this system is as follows: Upon the insertion of the key in the ignition switch 39, current will flow from the battery 40 over a circuit that includes the winding 41, contact 45 of the switch 43, the armature 42, contacts 46 and 47 of switch 43 to ground at 48. This, we will assume, causes the cam to rotate in the direction Y as shown in Fig. 4, and the shaft 11 to oscillate, thereby causing the windshield wiper 37 to sweep back and forth across the windshield 38. When it is desired to stop the operation of the windshield wiper, the switch 43 is operated in the reverse direction so as to close its left contacts, 49, 50 and 51, thereby grounding the circuit at 44. This causes a reversal of current through the armature 42 and that, in turn, reverses the direction of rotation of the cam. When the follower enters the spur track or the parking slot in the cam, it will effect the operation of a microswitch, as 53, and will stop the rotation of the cam. One end of the oscillator shaft 11 is securely fastened to the disc 52 of the microswitch 53 as shown more clearly in Fig. 9a, so that the disc 52 will rotate with the shaft 11. The end of the oscillator shaft 11, as there shown, is riveted over a washer 61 which secures the disc 52 to the end of the shaft 11. The other end of the shaft is knurled to provide for the ready attachment of the wiper-arm. The disc 52 has an elongated notch formed along the circumference thereof, as shown clearly in Fig. 9a, and it will normally oscillate through the range represented, for example, by angle AOC (Fig. 3a) which represents the normal angular movement of the axis of the shaft 10 (Fig. 3) and also the normal angular movement of the shaft 11. Throughout this range of movement, the faces 66 and 66a at the ends of the notch do not make contact with the arm 54 of the microswitch, which is pivoted at 58, and, in consequence, the contacts of the microswitch will remain closed. When the follower comes under the control of the slot 30 in the rear wall of the cam as shown in Figs. 4 and 5, and approaches or reaches the stopping position at the end of the slot its shaft 11 will have moved through a greater range than the angle AOC, the increase being represented by an angle that equals or approaches in equality the angle AOD of Fig. 3a. The consequence of this greater angular movement of the follower is to eventually bring the face 66a at the end of the notch in the disc 52 into contact with the pivoted member 54 of that switch and to effect the tripping of that switch, and the removal of the ground 48 from the motor circuit, thereby stopping the motor. Thereafter, when it is desired to start the operation of the windshield wiper, the switch 43 is operated in its normal starting direction which closes its contacts 45, 46 and 47. This causes current to flow through the motor in the direction for normal operation, as described above, and the follower of the cam will then move from the slot 30 to the main track of the cam. This movement of the follower will cause the roller shaft 10 to move from the angular position OD (Fig. 3a) to position OC of that figure, and since the disc 52 of the microswitch (Fig. 9) is rotated by the shaft 11 to which shaft 10 is fastened, that disc will be rotated in the reverse direction. This will cause the face 66 at the end of the notch to press against the member 54 from the opposite side which will trip the switch and cause the closing of its contacts. Thereafter the cam that operates the windshield wiper will continue to rotate in its forward direction and the shaft 11 will oscillate through its assumed normal range of 110° as shown in Fig. 3a.

An alternate arrangement for connecting the driving motor to the cam unit is shown in Fig. 6a. This arrangement employs a torque tube 62 one end of which is clamped or otherwise suitably fastened to the housing 32 of the reduction gears of the motor, the other end of the tube being rigidly attached to the housing 25 of the cam unit. The shaft 63 is supported by bearings such as 65 and 23 at each end of the shaft. A rubber grommet 64 encircles the tube 62 where it passes through the dash 36. Through the use of a torque tube the torque reaction from the motor is transmitted back into the cam journals directly instead of being transmitted to the body of the car and then into the cam journals. This arrangement prevents oscillation of the separate units due to torque and reduces to a minimum the vibrations in the system.

Fig. 7 shows the mode of coupling together two cam units 35 and 55 to operate two windshield wipers. The unit 35 is that shown in Fig. 6, the cam being designed to be connected to a motor in the manner shown in the latter figure. The cam unit 55 at the right-hand side of the figure is driven by the unit 35 at the left-hand side, the drive being effected by means of a shaft 56 which is connected with the cam shafts of both units, universal joints, as 57, being provided, if necessary. In Fig. 7 the cam operated microswitch 53, similar to that shown in Fig. 9, is shown connected to the right-hand cam unit, but it is to be understood that that switch may be connected to and controlled by either of the cam units.

While the invention has been described and illustrated as applied to the operation of one and two windshield wipers, it is applicable to a greater number, this feature being of great importance in the sweeping of a wide windshield having no break in the continuity of the glass throughout its width. In the arrangements heretofore employed for operating windshield wipers, the motor which activates the blades has been placed in the middle of the dash with extending connecting links between the motor and the blades. The attempted application of the older mechanism to the operation of three or more wipers involves mechanical difficulties that renders its application practically impossible. The present invention makes the operation of three or more wipers by a single motor relatively simple. It requires only the placing of a cam unit at the center of the dash, which not only operates a wiper at the center of the windshield, but also, by connections between the drive shaft of the center unit and the shafts of two adjacent units, one at each side, operates the wipers between the center and the ends of the windshield. This make possible the driving of three cam units by a single motor connected to the center unit. The use of three blades, arranged so that the swept surface overlaps, eliminates the unswept portion that now occurs at the bottom of the V when two wipers are employed, and thereby greatly increases the area of clear vision through the windshields.

It is desirable to point out that in the operation of a windshield wiper system employing the present invention it is possible to adjust the switch controlling the motor so as to open the circuit very close to the end of the parking position without harmful inertia effects in stopping, this being due largely to the frictional force upon the wipers.

Since in a two-windshield wiper arrangement the blades are normally thrown toward opposite ends of the windshield when the blades are parked, it is essential that the cams embodying the present invention be arranged to accomplish that result. This may be done by properly positioning the parking slot in each cam so that the angular movement of the shaft of the follower of each cam will be extended during the parking movement of the cam in such direction that the windshield wipers, when parked, will point either toward each other or away from each other. This control of direction of the wipers is effected by placing the parking slot in the rear disc of the cam operating one of the wipers, as shown in Fig. 4, and placing the slot in the front disc of the cam operating the other wiper, the slots being placed so as to be effective upon reversal of the cam after the shaft of the follower has reached the end of its normal angular movement, as indicated by OA and OC in Fig. 3a.

As explained hereinbefore, in describing the operation of the cam shown in Fig. 4, if reversal of the cam takes place at 270°, when the axis of the roller-follower is displaced 55° toward the left from normal, the slot in the third quadrant of the rear disc will take control of the follower and will cause its shaft 11 to rotate further (counter-clockwise as shown in Fig. 4) until the follower reaches the end of the slot and rotation of the cam ceases. The windshield wiper, which is oscillated by the shaft 11, will then point toward the left along the line OD, Fig. 3a. The other wiper may be caused to park in the diametrically opposite direction by placing the parking slot in the first quadrant of the front disc of its cam, which otherwise would be similar to that shown in Fig. 4. If reversal of such a cam takes place when the axis of the roller follower reaches its maximum displacement toward the right at 90° (Fig. 4), the slot located in the first quadrant of the front disc will take control of the roller follower and will cause the shaft 11 to rotate further (clockwise as shown in Fig. 4) until the follower reaches the end of the slot in the front disc of the cam and rotation of the cam ceases. The wiper thus controlled will then point toward the right, diametrically opposite to the parking position of the first mentioned wiper. It will, of course, be realized that in installing these cams, the relative angular relationship of the cams must be such as to ensure the desired relative positions of the wipers. If, for example, the follower of the right-hand cam is at 90° and that of the left-hand cam is at 270°, each wiper will be at its maximum angular inclination from the center of the windshield, with right at 180° and left at 360°, the wipers will be vertical; with right at 270° and left at 90°, both wipers will be inclined towards the center of the windshield.

Although the cam in the forms shown in Figs. 1 and 2 is represented as formed from a single piece of material, it is to be understood that it may be formed in two parts, and the cam as thus formed may be securely fastened together and also to the cam shaft by a set screw or a key or other well known means in the manner shown in Fig. 3.

In describing the operation of the cam the angular displacement of the follower with respect to a plane perpendicular to the shaft of the cam has been stated as being 55°, thus making the total angular movement of the follower 110° for normal forward movement of the cam. While this angle is greater than that attainable by the devices employing a crank and linkage action heretofore used, it by no means represents the maximum angular range of movement of the follower of the cam in which the present invention is embodied. This cam permits oscillatory motion up to 180°, included angle, thus making it possible to cover more thoroughly the wiped surface of a windshield at a greater angle than is possible through the use of prior devices. The present cam also permits the extension of the parking angle to remove the windshield wiper further from the line of vision of the operator.

It is desired to point out that the walls of the cam track may be parallel to each other as shown in Figs. 5 to 5e for all quadrants except that in which the parking slot is located, or the walls may be sloped to provide a tapered track. The latter may be preferable for extreme loads since it is desirable to provide a force component tending to hold the roller against the shaft on a thrust bearing. Further it should be noted that dwells in the cam may extend to any angle and a single movement of the follower away from and back to this dwell line may be made.

In the operation of a windshield wiper employing the cam herein disclosed it may be found that at a point of maximum displacement of the roller follower, say 270°, the tension of the wiper system may tend to hold the follower against the inner wall of the main track of the cam and thus oppose its passage into the spur track. It has been found that if the direction of rotation of the cam is reversed slightly beyond the 270° position of the cam, this tension will be gradually released and finally converted into a force in the opposite direction so that when the end of the roller shaft 10 reaches the slot 30 (Fig. 4) or the junction point between main and the spur track (Fig. 1) the force will tend to urge the roller follower into the spur track.

Cams embodying this invention may be made in various ways, those shown in Figs. 1 and 2 may be made by a cutter or a cam generator or even by hand. Cams having the form shown in Fig. 3 would preferably be stamped, pressed, or die-cast.

While this invention has been disclosed as embodied in particular forms and arrangements of parts, it is capable of embodiment in other and different forms without departing from the spirit and scope of the appended claims.

What is claimed is:

1. A positive cam having a track for the production of harmonic motion in a follower, in which the walls of the track form an angle with a plane perpendicular to the axis of the cam whereby the shaft of the follower moves through a predetermined angular range when the track of the cam moves through one cycle, the angle between the walls of the track and the plane perpendicular to the axis of the cam increasing continuously from zero to a maximum between the positions 0° and 90° of the first quadrant of said cam, the angle between the walls of the track and the plane perpendicular to the axis of the cam decreasing continuously from a maximum to zero between the positions 90° and 180° of the second quadrant of said cam.

2. A positive cam having a track for the production of harmonic motion in a follower, in which the walls of the track form an angle with a plane perpendicular to the axis of the cam whereby the shaft of the follower moves through a predetermined angular range when the track of the cam moves through one cycle, the angle between the walls of the track and the plane perpendicular to the axis of the cam increasing in magnitude continuously throughout a portion of a revolution of the cam and thereafter decreases in magnitude continuously through another and substantially equal portion of the cam's revolution.

3. The structure defined by claim 2 further characterized in that the periods of increase and of decrease in magnitude of said angle are repeated a plurality of times during each complete revolution of said cam.

4. A positive cam for the production of harmonic motion in a follower, said cam having a track whose center line is a sinusoidal curve, the walls of said track forming an angle with a plane perpendicular to the axis of the cam whereby the shaft of the follower moves through a predetermined angular range when the track of the cam moves through one cycle, the angle between the walls of the track and the plane perpendicular to the axis of the cam increasing continuously from zero to a maximum between the positions of 0° and 90° of the first quadrant of said cam, the angle between the walls of the track and the plane perpendicular to the axis of the cam diminishing continuously from a maximum to zero between the positions 90° and 180° of the second quadrant of the cam.

5. A cam of the positive cyclic type having a follower, a main track and a spur track branching from the main track at the point of maximum angular displacement of the follower, the angle made by the walls of the spur track with a plane perpendicular to the axis of the cam increasing progressively from the branching point to the end of the spur track.

6. A rotatable cam of the positive cyclic type having a follower and having a peripheral groove controlling the follower and providing a main track and a spur track branching therefrom to which the follower may be thrown upon reversal of the normal direction of rotation of the cam, the maximum angular displacement of the follower during engagement with the main track being increased by the engagement of the follower with the spur track.

7. A cam of the positive cyclic type and a follower in engagement therewith, the follower having a roller mounted upon a shaft which is pivotally supported for oscillation about an axis spaced from the axis of the cam to permit the shaft to move through a fixed angular range, the axis of the shaft and the axis of the cam being disposed at right angles relative to each other.

8. In a windshield wiping system having a windshield wiper, a mechanism for oscillating said wiper comprising, in combination, a source of rotary motion, a positive cyclic cam connected to said source, a follower adapted to be connected to said wiper for oscillating the latter, said cam having a main track and a spur track connected thereto with either of which the follower may be in engagement, reversible switching means to change at will the direction of motion of said cam and means controlled by said follower to stop the rotary motion when the follower is at a predetermined position upon the spur track, the position upon the spur track for maximum angular displacement of the follower being slightly beyond the junction of the spur track and the main track of the cam.

9. A system for oscillating a windshield wiper blade comprising, in combination, a motor, a grooved cyclic cam of the positive type arranged to be rotated by said motor, said cam having a follower in engagement with the track of said cam, a shaft fastened to said follower and having an axis disposed at right angles to the axis of said cam and spaced from said axis, the walls of the track of said cam forming an angle with a plane perpendicular to the axis of said cam which angle varies as said cam is rotated thereby causing said shaft to move back and forth periodically through a fixed angular distance for each revolution of said cam, and an arm fastened to said shaft and adapted to support a windshield blade.

10. A system for oscillating a windshield wiper blade comprising, in combination, a source of rotary motion, a grooved cyclic cam of the positive type arranged to be rotated by said source, said cam having a follower in engagement with the track of said cam, a shaft fastened to said follower and having an axis disposed at right angles to the axis of said cam, the walls of the track of said cam forming an angle with a plane perpendicular to the axis of said cam which angle varies as said cam is rotated thereby causing said shaft to move periodically through a fixed angular distance for each revolution of said cam, and an arm fastened to said shaft and adapted to support a windshield blade.

11. A system for oscillating a windshield wiper blade comprising, in combination, a motor, a grooved cyclic cam of the positive type arranged to be rotated by said motor and having a main track and a spur track communicating with said main track, said cam having a follower adapted for engagement with either track of said cam, a shaft fastened to said follower and having an axis disposed at right angles to the axis of said cam, the walls of the main track of said cam forming an angle with a plane perpendicular to the axis of said cam which angle varies as said cam is rotated thereby causing said shaft to move periodically through a fixed angular distance for each revolution of said cam in one direction, and an arm fastened to said shaft and adapted to support a windshield blade, the walls of the spur track of said cam forming an angle with a plane perpendicular to the axis of said cam which angle varies as said cam is rotated, the maximum angle formed by the walls of said spur track with said plane perpendicular to the axis of said cam being greater than the maximum angle formed by the walls of said main track with said plane perpendicular to the axis of said cam, thereby causing said shaft to move through an angular distance greater than said fixed angular distance when said cam is turned in the other direction.

12. A system for oscillating a windshield wiper blade comprising, in combination, a motor, a grooved cyclic cam of the positive type arranged to be rotated by said motor and having a main track and a spur track communicating with said main track, said cam having a follower adapted to engage the main track of said cam for rotation of said cam in one direction and the spur track of said cam for rotation of said cam in the other direction, a shaft fastened to said follower and having an axis disposed at right angles to the axis of said cam, the walls of the main track of said cam forming an angle with a plane perpendicular to the axis of said cam which angle varies as said cam is rotated thereby causing said shaft to move periodically through a fixed angular distance for each revolution of said cam, an arm fastened to said shaft and adapted to support a windshield blade, reversible switching means to change at will the direction of rotation of said cam, and means controlled by said follower to stop the rotary motion when the follower is at a predetermined position upon the spur track.

References Cited in the file of this patent

UNITED STATES PATENTS

| Number | Name | Date |
|---|---|---|
| 300,539 | Warwick | June 17, 1884 |
| 942,222 | Smith | Dec. 7, 1909 |
| 1,425,754 | Denyes | Aug. 15, 1922 |
| 1,871,020 | Wyzenbeek | Aug. 9, 1932 |
| 2,477,542 | Lane | July 26, 1949 |
| 2,587,163 | Jackson | Feb. 26, 1952 |